(12) United States Patent
Alicot et al.

(10) Patent No.: US 8,610,543 B2
(45) Date of Patent: Dec. 17, 2013

(54) HYBRID ARCHITECTURE FOR RADIO FREQUENCY IDENTIFICATION AND PACKET RADIO COMMUNICATION

(75) Inventors: Jorge F. Alicot, Davie, FL (US); Mohammad Mohiuddin, Boynton Beach, FL (US); Timothy J. Relihan, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 496 days.

(21) Appl. No.: 12/821,260

(22) Filed: Jun. 23, 2010

(65) Prior Publication Data

US 2011/0317594 A1    Dec. 29, 2011

(51) Int. Cl.
*H04B 7/14*   (2006.01)
*H04Q 5/22*   (2006.01)

(52) U.S. Cl.
USPC .................. 340/10.1; 340/10.4; 370/279

(58) Field of Classification Search
USPC ......... 340/10.1–10.9, 571.1–571.9; 455/41.1, 455/41.3, 344; 370/279
See application file for complete search history.

(56) References Cited

U.S. PATENT DOCUMENTS

| | | | | |
|---|---|---|---|---|
| 4,672,601 A | * | 6/1987 | Ablay | ............................ 370/277 |
| 6,078,251 A | * | 6/2000 | Landt et al. | ................. 340/10.41 |
| 6,560,443 B1 | * | 5/2003 | Vaisanen et al. | ................ 455/73 |
| 6,771,612 B1 | * | 8/2004 | Park | .............................. 370/276 |
| 7,420,458 B1 | * | 9/2008 | Kuzma et al. | ............. 340/10.34 |
| 7,532,908 B2 | * | 5/2009 | Rofougaran et al. | ...... 455/552.1 |
| 7,671,720 B1 | * | 3/2010 | Martin et al. | ................ 340/10.1 |
| 7,688,208 B2 | * | 3/2010 | Schuler et al. | ............. 340/572.1 |
| 7,705,711 B2 | * | 4/2010 | Takeuchi | ..................... 340/10.1 |
| 7,878,395 B2 | * | 2/2011 | Adams et al. | ................. 235/382 |
| 7,929,934 B2 | * | 4/2011 | Oishi et al. | ................. 455/249.1 |
| 8,019,379 B2 | * | 9/2011 | Rofougaran et al. | ...... 455/552.1 |
| 8,249,502 B2 | * | 8/2012 | Savry | .......................... 455/41.1 |
| 8,275,382 B2 | * | 9/2012 | Lewis | ........................... 455/451 |
| 2003/0025631 A1 | * | 2/2003 | Kim | .............................. 342/198 |

(Continued)

FOREIGN PATENT DOCUMENTS

EP    1545015 A2    6/2005

OTHER PUBLICATIONS

EPO International Search Report dated Oct. 8, 2011 for corresponding appln PCT/US11/01092.

(Continued)

*Primary Examiner* — Hai Phan
*Assistant Examiner* — Royit Yu
(74) *Attorney, Agent, or Firm* — Alan M. Weisberg; Christopher & Weisberg, P.A.

(57) ABSTRACT

A radio frequency identification ("RFID") hybrid packet radio is provided having full duplex operability. The RFID packet radio includes an antenna and a radio that receives and transmits a packet radio signal and a RFID signal. A processor is provided in communication with the radio to perform signal detection and demodulation with respect to the RFID signal. A transmit path is provided to transport the packet radio signal and the RFID signal from the radio to the antenna. The RFID packet radio includes a first receive path for transporting a received packet radio signal from the antenna to the radio and a second receive path, different from the first receive path, to transport a received RFID signal from the antenna to the processor. The first receive path and the second receive path enable simultaneous transmission and reception of RFID signals.

17 Claims, 3 Drawing Sheets

(56) References Cited

U.S. PATENT DOCUMENTS

| | | | |
|---|---|---|---|
| 2004/0137852 A1* | 7/2004 | Shi et al. ........................... 455/73 |
| 2005/0085237 A1* | 4/2005 | Yang et al. ................. 455/452.2 |
| 2007/0046435 A1* | 3/2007 | Fratti et al. ................... 340/10.2 |
| 2007/0066278 A1 | 3/2007 | Hong |
| 2007/0126584 A1* | 6/2007 | Hyde et al. ................. 340/572.4 |
| 2007/0205865 A1* | 9/2007 | Rofougaran et al. ......... 340/10.1 |
| 2008/0074282 A1* | 3/2008 | Koo et al. .................. 340/825.7 |
| 2008/0232279 A1* | 9/2008 | Marholev ....................... 370/280 |
| 2008/0280574 A1* | 11/2008 | Rofougaran et al. ......... 455/126 |
| 2009/0028074 A1* | 1/2009 | Knox ............................. 370/278 |
| 2009/0156276 A1* | 6/2009 | Rofougaran ............... 455/575.7 |
| 2009/0221232 A1 | 9/2009 | Estevez |
| 2009/0276338 A1* | 11/2009 | Masermann et al. ............ 705/28 |
| 2009/0319677 A1* | 12/2009 | Masermann et al. ......... 709/229 |
| 2010/0142508 A1* | 6/2010 | Walley et al. ................. 370/343 |
| 2010/0323635 A1* | 12/2010 | Steeper et al. ................... 455/77 |
| 2011/0234399 A1* | 9/2011 | Yan .......................... 340/539.32 |
| 2011/0299444 A1* | 12/2011 | Rofougaran .................. 370/310 |
| 2011/0309931 A1* | 12/2011 | Rose ........................ 340/539.13 |
| 2012/0003938 A1* | 1/2012 | Kawaguchi et al. ......... 455/63.1 |
| 2012/0165684 A1* | 6/2012 | Sholder ........................ 600/483 |
| 2012/0249292 A1* | 10/2012 | Wong et al. .................. 340/5.52 |
| 2012/0268250 A1* | 10/2012 | Kaufman et al. ............ 340/10.1 |
| 2012/0276858 A1* | 11/2012 | Walley et al. ................... 455/73 |

OTHER PUBLICATIONS

Wikipedia: "Packet Radio" May 16, 2010, XP002659867, retrieved from the Internet URL: http//en.wikipedia.org/w/index.php?li [retrieved on Sep. 23, 2011]—the whole document (Cited in EPO International Search Report).

* cited by examiner

HYBRID ARCHITECTURE FOR RADIO FREQUENCY IDENTIFICATION AND PACKET RADIO COMMUNICATION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for integrating radio frequency identification technology and radio packet technology. More specifically, the invention relates to a method and system for providing full duplex operability to a half duplex packet radio system by adding a secondary receive path that receives radio frequency identification ("RFID") backscatter signals during signal transmission.

BACKGROUND OF THE INVENTION

Radio frequency identification ("RFID") systems are used in a variety of applications, including for automated tracking, identifying and authenticating of items. A RFID system typically includes one or more readers (also commonly referred to as interrogators) and RFID tags (also commonly referred to as markers or transponders). Readers are typically positioned at locations where it is desired to control or receive information from the RFID tags that are affixed to items, such as goods, assets, documents or livestock. Reader locations may include entry and/or exit points, inventory control points, or transaction terminals.

The RFID tags may store an identification code having a predefined structure including a header, payload information and a cyclic redundancy code ("CRC") for error correction. The payload information may include identification information, authentication information or other information, such as sequence instructions for processes or operations that are to be conducted upon an item bearing a selected RFID tag. The data packets may be stored in a memory device within the RFID tag, such as a read only memory ("ROM") or nonvolatile programmable memory.

Additionally, the RFID tags may support Electronic Product Code ("EPC"), a globally unique serial number that identifies items traveling within a supply chain. The EPC contains information about an item manufacturer, an item type and a specific item serial number. The EPC can also be associated with dynamic data, such as an item origination point or an item production date. The RFID system allows users to perform inquiries using EPC to locate a single instance of an item anywhere within the supply chain.

The data packets are communicated between the RFID tag and the reader over wireless media using a wireless communication device. The RFID tag may be configured as an active RFID tag or a passive RFID tag. Active RFID tags include an energy source, such as a battery, to enable the RFID tag to independently perform operations, such as initiating communication of data packets. Passive RFID tags do not include an energy source and obtain energy from an interrogation signal received from the reader, which enables the RFID tag to initiate communication of the data packets. Active and passive RFID tags are known in the art and are not described further herein.

Conventional RFID architectures include specialized RFID chips having transceivers that include high performance integrated circuit ("IC") components. These specialized RFID chips are relatively expensive to produce. What is needed is a system and method of providing RFID wireless communications using low cost components. One type of low cost wireless communication device is a packet radio.

Conventional packet radios are deficient because they provide only half duplex operations. Additionally, conventional packet radios are deficient for RFID applications at least because of their limited dynamic range, lack of isolation between the receiver and transmitter and multiplexed or channelized operation. During multiplexed or channelized operation, the transmitter for a conventional packet radio is turned off while it receives a wireless packet transmission. Alternatively, conventional packet radios use different frequencies to transmit and receive data. If the transmitter is not turned off during reception or if the transmitter and receiver fail to operate on different frequencies, the receiver becomes saturated when a high interference signal is generated by the packet radio transmitter. During saturation, the transmitter captures the available receiver dynamic range. To avoid saturation, conventional packet radios either turns off their transmitter when in receive mode or receive signals using a different frequency than the transmitter. What is needed is a system and method of providing full duplex wireless RFID communications using low cost components.

SUMMARY OF THE INVENTION

The present invention advantageously provides a method and system for providing full duplex wireless RFID communications using packet radio connectivity. According to one embodiment, the invention provides a radio frequency identification ("RFID") hybrid packet radio having an antenna and a radio that receives and transmits a packet radio signal and a RFID signal. The RFID hybrid packet radio or RFID packet radio includes a combination of RFID functionality and packet radio functionality. A processor is provided in communication with the radio to perform signal detection and demodulation. The RFID packet radio includes a transmit path that transports the packet radio signal and the RFID signal from the radio to the antenna. The RFID packet radio further includes a first receive path that transports a received packet radio signal from the antenna to the radio and a second receive path, which is different from the first receive path, to transport a received RFID signal from the antenna to the processor.

According to another embodiment, the invention provides a radio frequency identification ("RFID") communication system having a server and a RFID tag reader. The RFID tag reader is in communication with the server and includes a wireless RFID packet radio. The RFID packet radio includes an antenna and a radio that receives and transmits a packet radio signal and a RFID signal. A processor is provided in communication with the radio. The processor may perform signal detection and demodulation for the RFID signal. By contrast, the packet radio may perform signal detection and demodulation for the packet radio signal. The RFID packet radio includes a transmit path that transports the packet radio signal and the RFID signal from the radio to the antenna. The RFID packet radio further includes a first receive path that transports a received packet radio signal from the antenna to the radio and a second receive path, which is different from the first receive path, to transport a received RFID signal from the antenna to the processor.

According to another embodiment, a method is provided for performing communication using a radio frequency identification ("RFID") packet radio, including transmitting a RFID signal using the RFID packet radio and receiving at the RFID packet radio, simultaneous with the RFID signal transmission, a RFID backscatter signal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
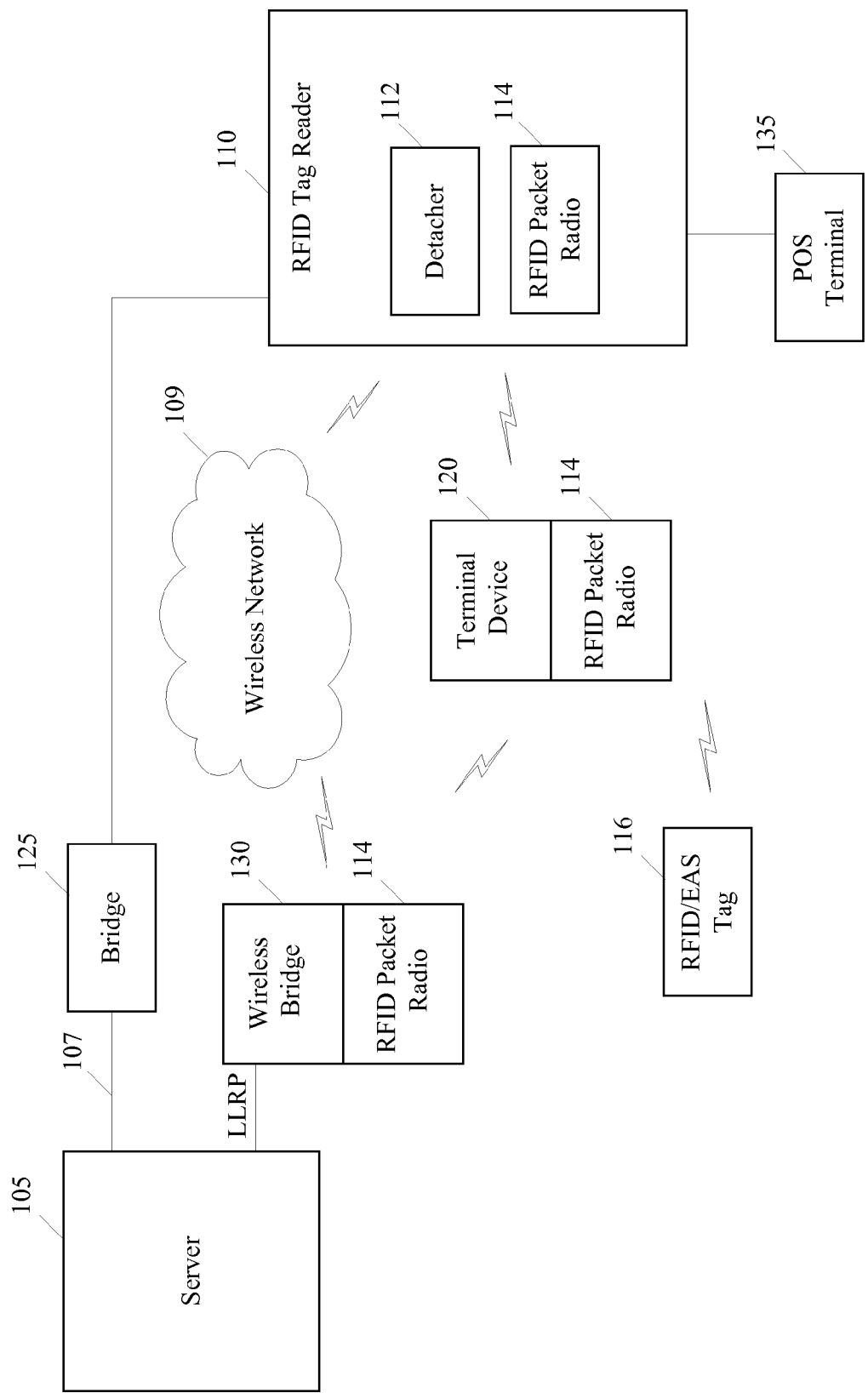
FIG. 1 is a block diagram of an exemplary communication system deployed in a supply chain environment that uses full duplex wireless radio connectivity to communicate between a radio frequency identification tag reader and a server constructed in accordance with the principles of the present invention.

Before describing in detail exemplary embodiments that are in accordance with the present invention, it is noted that the embodiments reside primarily in combinations of apparatus components and processing steps related to implementing a system and method of providing full duplex wireless RFID communications using low cost components. Accordingly, the system and method components are represented, where appropriate, by conventional symbols in the drawings. The drawings show only those specific details that are pertinent to understanding the embodiments of the present invention, so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element, without necessarily requiring or implying any physical or logical relationship or order between such entities or elements.

One embodiment of the invention advantageously provides a method and system for providing full duplex wireless RFID communications using wireless packet radio connectivity. According to one embodiment, a secondary receive path is added to a packet radio System on Chip ("SoC"). The secondary receive path supplements an existing receive path provided with the conventional packet radio SoC. The invention enables the packet radio SoC to simultaneously transmit and receive a signal at the same frequency. In other words, the packet radio SoC transmits a signal while simultaneously receiving RF backscatter transmission on the secondary receive path. The invention therefore transforms a half duplex packet radio SoC into a full duplex hybrid packet radio SoC. The full duplex operation allows the packet radio to operate as a RFID transceiver. Regarding the dynamic range of a full duplex packet radio, the transmitter's continuous wave signal may be 70 dB higher than a RFID/EAS tag's backscattered information. By contrast, a conventional transmitter may operate at over 30 dBm output power. With a 20 dB isolation, the received signal is +10 dBm. By comparison, a backscatter tag response may be −60 dBm or less.

The invention provides a multiplexing of operation between RFID transactions and packet radio transactions. FIG. 1 illustrates a system architecture 100 that may be deployed in an environment, such as a supply chain, according to one embodiment of the invention. The environment may include a retail store environment or a warehouse environment, among other environments. The system architecture 100 is configured to provide full duplex wireless packet radio connectivity. A server 105 is coupled to a plurality of devices via a wired network 107, a wireless network 109, or a combination of the wired network 107 and the wireless network 109 and/or other networks. The devices may include a radio frequency identification ("RFID") tag reader 110, a terminal device 120, a wired bridge 125, a wireless bridge 130 and a point of service ("POS") terminal 135, among other devices. The POS terminal 135 may be coupled to the RFID tag reader 110 using a wired connection, such as a USB connection, or may be wirelessly coupled to the RFID tag reader 110. The devices may be constructed using components to facilitate adding, deleting, updating and/or amending components therein and/or features within components. It should be readily understood that the devices may include a greater or lesser number of components. One skilled in the art will readily appreciate that the invention may be implemented using individual components or a single component that incorporates the features of two or more separately described components.

The RFID tag reader 110 may be positioned within the supply chain environment to read RFID tags 116 affixed to items such as those traveling in the supply chain. The RFID tag reader 110 may include several components, including a detacher 112 and an RFID packet radio 114, among other components. The detacher 112 is positioned at the RFID tag reader 110 to interrogate and/or deactivate the RFID and electronic article surveillance ("EAS") tags 116 and/or detach the RFID/EAS tags 116 affixed to monitored items. The detacher 112 may include a power source, a processor for performing detacher operations and various connectors for connecting to external devices, among other components. Regarding connectors, the detacher 112 may include an RJ45 connector or a universal serial bus ("USB") connector, among other connectors. The RFID packet radio 114 is a full duplex wireless RFID packet radio 114 for performing RFID communications. Conventional packet radios include a transmitter and receiver that operate in half duplex mode. In other words, conventional packet radios are not configured to concurrently send and receive data over a radio link. Rather, conventional packet radios operate by first transmitting a burst of data packets and then stopping data transmissions to listen for a response signal.

Figure 2:
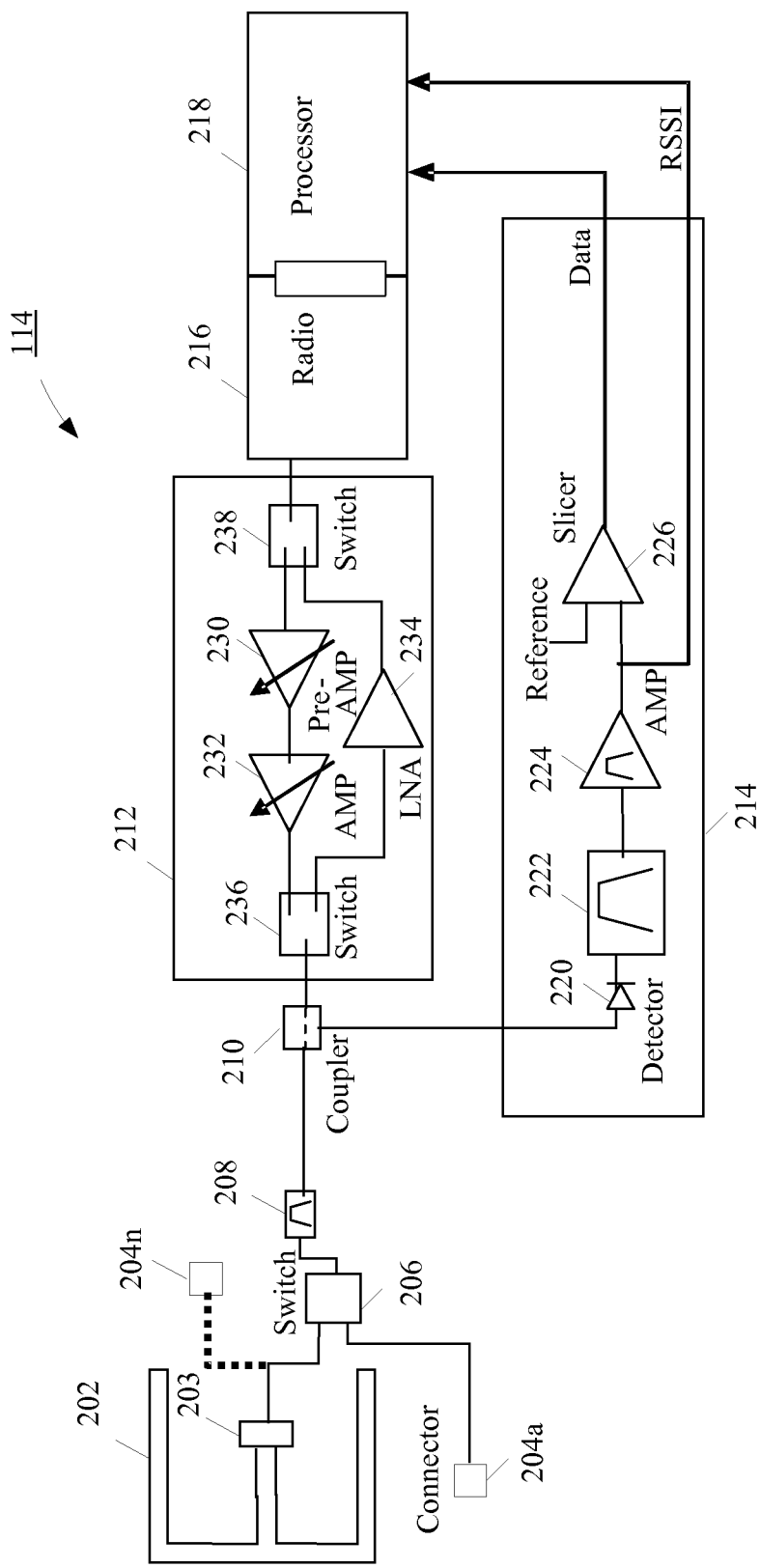
FIG. 2 is a block diagram of an exemplary communication device that provides full duplex wireless packet radio connectivity constructed in accordance with the principles of the present invention.

FIG. 2 illustrates the full duplex wireless RFID packet radio 114 according to one embodiment of the invention. The RFID packet radio 114 includes an antenna 202, connectors 204a, 204n (hereinafter connectors 204), an antenna switch 206, a filter 208, a coupler 210, an integrated amplifier and low-noise amplifier ("LNA") circuit 212, a RFID detector and receiver circuit 214, a radio 216 and a processor 218. According to one embodiment, the radio 216 and processor 218 may be integrated in a single chip to allow size reduction and reduced component costs. Alternatively, the radio 216 and processor 218 may be provided on separate chips. The radio 216 is configured to provide functionality for packet radio wireless communication. For example, the radio 216 provides a radio frequency ("RF") output at a given power level. The radio 216 may support various transmitter modulation methods, such as Amplitude Shift-Keying "ASK"), Minimum Shift-Keying ("MSK"), and Gaussian Frequency Shift-Keying ("GFSK"), among other modulation methods. The radio 216 also may support wireless communication methods of robust transmissions, such as, Forward Error Correction ("FEC"), Interleaving, and Data whitening methods.

The processor 218 is configured to manage the radio 216 and perform driver and application operations. The processor 218 further operates to decode and process the base band RFID signals. When the RFID packet radio 114 operates in RFID mode, the processor 218 decodes specific RFID protocols that differ from wireless packet radio protocols. The processor 218 is configured to manage and transfer wireless communication data or RFID data to a host system. When the RFID packet radio 114 operates in packet radio mode, the RFID detector and receiver circuit 214 is disabled and the integrated amplifier and low-noise amplifier ("LNA") circuit 212 receives the incoming signals as packet radio transmissions. Communications may be performed using serial communication transfers or parallel communication transfers, among other transfer methods. According to one embodiment, the processor 218 operates with processor speeds in a range of 20 MHz to 30 MHz. By contrast, existing RFID readers and interrogators use processors, such as digital signal processors, having processor speeds that are 150 MHz or greater.

The RFID detector and receiver circuit 214 provides the RFID packet radio 114 with a secondary channel for receiving RFID backscatter signals. The RFID detector and receiver circuit 214 includes a diode detector 220 and a signal conditioning section. The signal conditioning section may include a filter 222, an amplifier 224 and a slicer 226, among other components. The diode detector 220 may use zero biased diodes to provide improved signal sensitivity. The slicer 226 receives inputs from a reference signal and an output of the amplifier 224. The slicer 226 may include a comparator and a reference threshold level. An input signal received at the slicer 226 is compared to a threshold value. The slicer 226 generates a high or low output signal based on a level of the signal received from the amplifier 224. The output from the slicer 226 is provided to the processor 218 for signal detection and demodulation. According to one embodiment, an output from the slicer 226 may include RFID backscatter data. Thus, the RFID detector and receiver circuit 214 forms a secondary receive path that enables the RFID packet radio 114 SoC to transmit a signal while simultaneously receiving RF backscatter transmission.

Additionally, the RFID detector and receiver circuit 214 may sample the base band signal between the amplifier 224 and the slicer 226 to evaluate the received signal strength. Alternatively, the RFID detector and receiver circuit 214 may sample the base band signal at other locations. The RFID detector and receiver circuit 214 may perform the signal strength evaluation using an A/D converter included in the processor 218. According to one embodiment, the location of the receive signal strength indicator ("RSSI") measurement point may be buffered with an operational amplifier to reduces the effect on the receiver base band chain.

According to one embodiment, the integrated amplifier and low-noise amplifier circuit 212 is provided in a single chip to include a first path having a pre-amplifier 230 and an amplifier 232 and a second path having a low-noise amplifier ("LNA") 234. Alternatively, the integrated amplifier and low-noise amplifier circuit 212 may be provided in separate chips. The LNA 234 is used in wireless packet radio communications to improve communication range. For lower performance applications, the integrated amplifier and low-noise amplifier circuit 212 may be omitted. In this case, the radio output RF power is sufficient to meet the operational requirements of the application and the integrated amplifier and low-noise amplifier circuit 212 is not provided.

The switches 236, 238 are provided to select between the first path having the pre-amplifier 230 and the amplifier 232 or the second path having the LNA 234. When the switches 236, 238 are positioned to select the first path, signals are transmitted from the radio 216 through the pre-amplifier 230 and the amplifier 232 to a coupler 210. When the switches 236, 238 are positioned to select the second path, the signals are received at the radio 216 through the LNA 234. Under this configuration, the integrated amplifier and low-noise amplifier circuit 212 operates in a half duplex mode.

An antenna switch 206 is provided to select between operation of the antenna 202 or the connectors 204. The antenna 202 may include a printed circuit board ("PCB") integrated antenna and the connectors 204 may include micro-miniature coaxial ("MMCX") connectors. A balun 203 may be provided at the antenna to correct for any imbalance, such as performing an unbalanced to balanced conversion. The RFID packet radio 114 may be configured to use the antenna 202 and one connector 204 or two connectors 204, among other configurations. The RFID packet radio 114 may perform the selection using 0 ohm resistors or jumpers, among other components.

The antenna switch 206 is connected to the coupler 210 through a filter 208 that shapes the signal. The coupler 210 provides RFID operation by selectively coupling between the integrated amplifier and low-noise amplifier circuit 212, the RFID detector and receiver circuit 214 and the antenna 202 and the connectors 204 through the filter 208 and the antenna switch 206. Filters and matching components may be provided between the integrated amplifier and low-noise amplifier circuit 212 and the coupler 210.

The coupler 210 routes wireless packet radio communication signals bi-directionally between the antenna 202 or connectors 204 and the radio 216 through the integrated amplifier and low-noise amplifier circuit 212. Furthermore, the coupler 210 routes back scatter signals between the antenna 202 or connectors 204 and the processor 218 through the RFID detector and receiver circuit 214. In other words, the coupler 210 selectively directs back scatter signals from the RFID/EAS tag 116 to the processor 218 through the RFID detector and receiver circuit 214. The coupler 210 is lossy and may introduce signal losses compared to a system that does not include the coupler 210. As an alternative to the coupler 210, the RFID packet radio 114 may include a circulator to reduce the attenuation of the received signal.

Returning to FIG. 1, the RFID tag reader 110 may communicate with the server 105 over the wireless network 109 using the RFID packet radio 114 coupled to the wireless bridge 130 access point. The wireless bridge 130 may include a router, among other devices. The RFID packet radios 114 coupled to the RFID tag reader 110 and the wireless bridge 130 may communicate using ultra high frequency ("UHF") packet radio protocols. According to one embodiment, the RFID packet radio 114 associated with the RFID tag reader 110 reads the EPC stored on the RFID tag 116 using the UHF Class 1 Gen 2 air interface protocol. According to one embodiment, the wireless bridge 130 and the server 105 may communicate the RFID tag information using Ethernet infrastructure with Low Level Reader Protocol ("LLRP"). LLRP is an EPCglobal standard that provides formats and procedures for communication between RFID readers and a RFID packet radio or other terminal device. The RFID tag reader 110 may use LLRP to report information, including status information, RF survey information, or access and inventory operation information, among other information. Communications using LLRP is in the form of protocol data units called messages that are sent to and received from the RFID reader and terminal devices. The LLRP may implement Transport Layer Security ("TLS").

Additionally, the RFID tag reader 110 may communicate with the server 105 over the wired network 107 via Ethernet using wired bridge 125. The wired bridge 125 may include any hardware device that provides wired communication between RFID tag reader 110 and the server 105. According to one embodiment, the wired bridge 125 supports Ethernet communications between RFID tag reader 110 and the server 105.

Furthermore, the RFID tag reader 110 may communicate with the server 105 over the wireless network 109 using the RFID packet radio 114 coupled to a point-to-point terminal device 120. The terminal device 120 may form an ad hoc network to provide direct communication between terminal devices 120 without using central access points. The RFID packet radios 114 coupled to the RFID tag reader 110 and the terminal device 120 may communicate using ultra high frequency ("UHF") packet radio protocols. According to one embodiment, point-to-point terminal devices 120 may be employed to extend the wireless communication range as desired.

Figure 3:
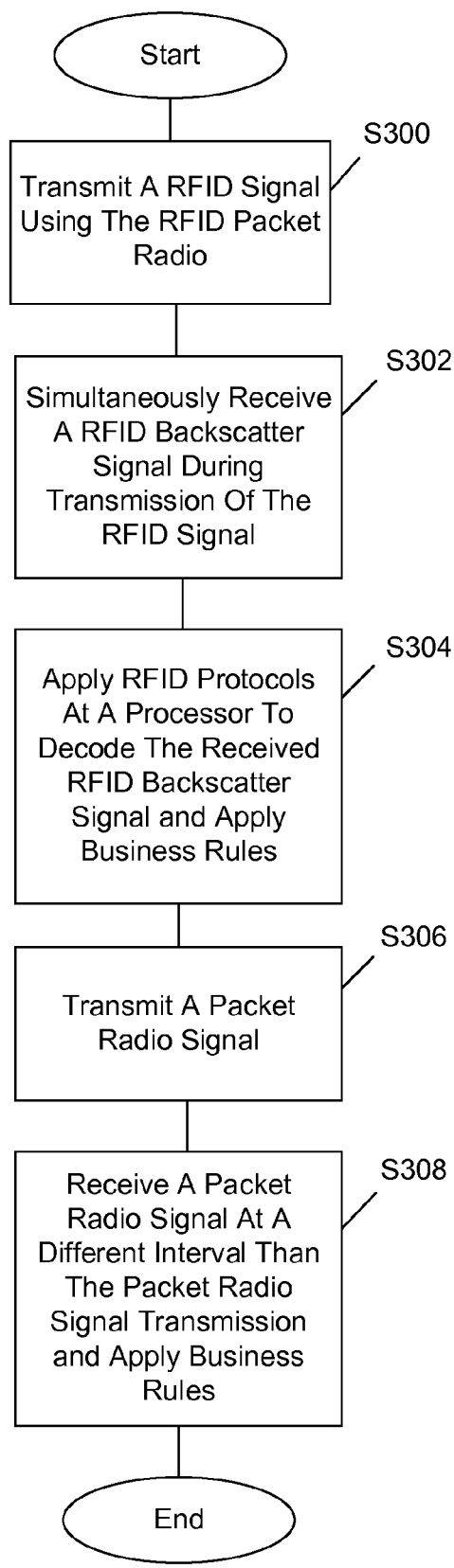
FIG. 3 is a flow chart of an exemplary full duplex communication process for a radio frequency identification packet radio in accordance with the principles of the present invention.

According to one embodiment of the invention described with reference to the flow chart of FIG. 3, the RFID packet radio transmits a RFID signal (Step S300) while receiving a RFID backscatter signal during the RFID signal transmission (Step S302). The RFID packet radio applies RFID protocols at a processor to decode the received RFID backscatter signal (Step S304). The processor may also apply business rules or perform a method that defines actions to be taken on the RFID tags. The RFID packet radio transmits a packet radio signal (Step S306) and receives the packet radio signal at a different time interval than the packet radio signal transmission (Step S308). The packet radio may also apply business rules or perform a method that defines actions to be taken by the packet radio.

The present invention can be realized in hardware or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A radio frequency identification ("RFID") packet radio system, the RFID packet radio system comprising:
    an antenna;
    a radio, the radio configured to receive and transmit packet radio signals and RFID signals, the receiving and the transmitting of the packet radio signals and the RFID signals occurring at a first frequency;
    a processor, the processor configured to be in communication with the radio and to perform signal detection and demodulation, the processor configured to receive an RFID signal at the first frequency;
    a transmit path, the transmit path configured to transport a packet radio signal to be transmitted and an RFID signal to be transmitted, from the radio to the antenna;
    a first receive path, the first receive path configured to transport a received packet radio signal from the antenna to the radio;
    a second receive path different from the first receive path, the second receive path configured to transport a received RFID signal from the antenna to the processor; and
    a coupling mechanism, the coupling mechanism in the transmit path and the second receive path and configured to simultaneously transmit a first RFID signal and receive a second RFID signal enabling the RFID packet radio system to operate in a full duplex mode.

2. The RFID packet radio system according to claim 1, further comprising a coupler configured to selectively and communicatively couples the antenna to the radio and the processor.

3. The RFID packet radio system according to claim 1, wherein the second receive path and the transmit path are configured to simultaneously transport signals.

4. The RFID packet radio system according to claim 1, wherein the radio and the processor are located on different integrated circuit devices.

5. The RFID packet radio system according to claim 1, further comprising switches configured to select between the transmit path and the first receive path.

6. The RFID packet radio system according to claim 1, wherein the second receive path includes a detector, an amplifier and a slicer, the slicer configured to provide data to the processor.

7. The RFID packet radio system according to claim 1, further comprising:
    a connector provided in parallel orientation to the antenna; and
    an antenna switch, the antenna switch configured to select one of the antenna and the connector.

8. A radio frequency identification ("RFID") communication system, the RFID communication system comprising:
    a server; and
    an RFID tag reader, the RFID tag reader in communication with the server, the RFID tag reader having a RFID packet radio, the RFID packet radio comprising:
        an antenna;

a radio, the radio configured to receive and transmit packet radio signals and RFID signals, the receiving and the transmitting of the packet radio signals and the RFID signals occurring at a first frequency;

a processor, the processor being in communication with the radio and configured to perform signal detection and demodulation, the processor configured to receive an RFID signal at the first frequency;

a transmit path, the transmit path configured to transport a packet radio signal to be transmitted and an RFID signal to be transmitted, from the radio to the antenna;

a first receive path, the first receive path configured to transport a received packet radio signal from the antenna to the radio;

a second receive path different from the first receive path, the second receive path configured to transport a received RFID signal from the antenna to the processor; and a coupling mechanism, the coupling mechanism in the transmit path and the second receive path and configured to simultaneously transmit a first RFID signal and receive the a second RFID signal enabling the RFID communication system to operate in a full duplex mode.

9. The RFID communication system according to claim 8, wherein the RFID packet radio further comprises a coupler configured to selectively couple the antenna to the radio and the processor.

10. The RFID communication system according to claim 8, wherein the second receive path and the transmit path are configured to simultaneously transport signals.

11. The RFID communication system according to claim 8, wherein the radio and the processor are located on different integrated circuit devices.

12. The RFID communication system according to claim 8, further comprising switches configured to select between the transmit path and the first receive path.

13. The RFID communication system according to claim 8, wherein the second receive path includes a detector, an amplifier and a slicer, the slicer configured to provide data to the processor.

14. The RFID communication system according to claim 8, further comprising:
a connector provided in parallel orientation to the antenna; and
an antenna switch configured to select one of the antenna and the connector.

15. A method of performing communication using a radio frequency identification ("RFID") packet radio, the method comprising:
transmitting via a bi-directional coupling mechanism an RFID signal using the RFID packet radio;
transmitting a first packet radio signal at a first frequency at which the RFID signal is transmitted;
receiving, at the first frequency, via the bi-directional coupling mechanism at the RFID packet radio, simultaneous with the RFID signal transmission, an RFID backscatter signal, the RFID packet radio operating in a full duplex mode; and
receiving a second packet radio signal at the first frequency.

16. The method of performing full duplex communication according to claim 15, further comprising applying RFID protocols at a processor to decode the received RFID backscatter signal.

17. The method of performing full duplex communication according to claim 15, further comprising receiving the packet radio signal at the RFID packet radio at a different time interval than the packet radio signal transmission.

* * * * *